US009103702B2

(12) United States Patent
Plankl et al.

(10) Patent No.: US 9,103,702 B2
(45) Date of Patent: Aug. 11, 2015

(54) FASTENING DEVICE FOR FASTENING AN ASSEMBLY IN AN OPENING OF A WALL OF A VEHICLE

(75) Inventors: Christian Plankl, Regensburg (DE); Michael Weinacht, Barbing (DE)

(73) Assignee: Continental Automotive GmbH, Hannover (DE)

(*) Notice: Subject to any disclaimer, the term of this patent is extended or adjusted under 35 U.S.C. 154(b) by 258 days.

(21) Appl. No.: 13/642,605

(22) PCT Filed: Apr. 20, 2011

(86) PCT No.: PCT/DE2011/000433
§ 371 (c)(1),
(2), (4) Date: Oct. 22, 2012

(87) PCT Pub. No.: WO2011/134456
PCT Pub. Date: Nov. 3, 2011

(65) Prior Publication Data
US 2013/0039697 A1    Feb. 14, 2013

(30) Foreign Application Priority Data

Apr. 30, 2010  (DE) .......................... 10 2010 019 092
May 19, 2010  (DE) .......................... 10 2010 020 959

(51) Int. Cl.
*F16B 21/04*   (2006.01)
*G01D 11/24*   (2006.01)
*G01D 11/30*   (2006.01)

(52) U.S. Cl.
CPC .............. *G01D 11/245* (2013.01); *F16B 21/04* (2013.01); *G01D 11/30* (2013.01); *Y10T 403/7005* (2015.01); *Y10T 403/7007* (2015.01)

(58) Field of Classification Search
USPC ................ 403/33, 44, 348, 349; 73/493, 756; 411/402, 409, 435; 248/27.1, 27.3
See application file for complete search history.

(56) References Cited

U.S. PATENT DOCUMENTS 1,860,715 A * 5/1932 Kellogg ..................... 411/409
5,067,750 A * 11/1991 Minneman ................... 285/38
(Continued)

FOREIGN PATENT DOCUMENTS

DE  43 31 795     3/1995
DE  195 28 474   2/1997
(Continued)

OTHER PUBLICATIONS

International Search Report of the International Searching Authority for International Application PCT/DE2011/000433, mailed Oct. 14, 2011, 2 pages, European Patent Office, HV Rijswijk, Netherlands.
(Continued)

*Primary Examiner* — Daniel P Stodola
*Assistant Examiner* — Jonathan Masinick
(74) *Attorney, Agent, or Firm* — W. F. Fasse

(57) ABSTRACT

A fastening device for fastening an assembly in an opening of a wall of a vehicle includes a supporting element to be placed on the vehicle wall and a retaining element having at least one retaining wing that fastens the device in the vehicle wall opening. The retaining element is rotatable relative to the supporting element between fastened and unfastened positions. For a tool-free mounting and fastening, the retaining element further includes a graspable rotating wing that has a grasping surface which is inclined at an angle in the direction of rotation, whereby the manual grasping force applied by the installer exerts a force component in a rotational direction to rotate the retaining element, and a force component in an axial direction to press the fastening device against the vehicle wall. Preferably the wing includes a wing wall and reinforcing webs.

20 Claims, 5 Drawing Sheets

(56) References Cited

U.S. PATENT DOCUMENTS

| | | | |
|---|---|---|---|
| 5,368,427 A | 11/1994 | Pfaffinger | |
| 6,179,273 B1 * | 1/2001 | Edmunds et al. | 256/13.1 |
| 6,647,793 B2 | 11/2003 | Dirmeyer et al. | |
| 6,755,601 B2 * | 6/2004 | Ohta | 411/171 |
| 6,837,645 B2 * | 1/2005 | Kanatani et al. | 403/348 |
| 7,618,211 B2 * | 11/2009 | Wood | 403/327 |
| 7,661,215 B2 * | 2/2010 | Okamoto | 40/620 |
| 2008/0056816 A1 * | 3/2008 | Sussenbach | 403/348 |
| 2009/0116901 A1 * | 5/2009 | Bohman et al. | 403/348 |
| 2009/0263207 A1 * | 10/2009 | Christ | 411/171 |
| 2010/0140419 A1 | 6/2010 | Brandt et al. | |
| 2010/0272540 A1 * | 10/2010 | Bucker et al. | 411/549 |
| 2012/0000291 A1 | 1/2012 | Christoph et al. | |
| 2013/0055822 A1 | 3/2013 | Frank | |

FOREIGN PATENT DOCUMENTS

| | | |
|---|---|---|
| DE | 199 23 985 | 12/2000 |
| DE | 102 56 970 | 6/2004 |
| DE | 102005026016 | 12/2006 |
| DE | 102006056391 | 4/2008 |
| DE | 102006059034 | 8/2008 |
| DE | 102007008862 | 8/2008 |
| DE | 102008048318 | 9/2010 |
| WO | WO 00/71978 | 11/2000 |
| WO | WO 2010/031676 | 3/2010 |

OTHER PUBLICATIONS

PCT International Preliminary Report on Patentability including English Translation of PCT Written Opinion of the International Searching Authority for International Application PCT/DE2011/000433, issued Nov. 6, 2012, 7 pages, International Bureau of WIPO, Geneva, Switzerland.

German Search Report for German Application No. 10 2010 020 959.7, dated Nov. 29, 2010, 2 pages, Muenchen, Germany, with English translation, 2 pages.

* cited by examiner

FASTENING DEVICE FOR FASTENING AN ASSEMBLY IN AN OPENING OF A WALL OF A VEHICLE

FIELD OF THE INVENTION

The invention relates to a fastening device for fastening an assembly in an opening of a wall of a vehicle.

BACKGROUND INFORMATION

In the automotive industry, components, particularly sensors (e.g., for restraint systems), are fastened to the vehicle in various ways, typically by means of screws, rivets or adhesives. Especially for sensors for safety-critical applications (e.g., airbag systems), reliable mounting is of crucial importance. On the one hand, correct mounting must be guaranteed when the vehicle leaves the factory. On the other hand, the sensor must remain safely mounted in the correct location and position or be safely replaceable during repairs or the like throughout its lifetime.

Therefore, the mounting process of present-day sensors that are fastened, e.g., by means of screws is documented in many cases. This may be done by, e.g., monitoring and recording the torque and the angle of rotation during the screwing process of the sensor.

From publication DE 199 23 985 A1, a sensor assembly is known in which the casing of an air pressure sensor used for side-on collision sensing is fastened to a wall in the vehicle by means of fastening means (e.g., screws), wherein the vehicle door preferably has a two-part structure with a dry space facing the interior of the vehicle and a wet space facing the external sheet metal as well as a dividing wall located therebetween. The air pressure sensor is arranged on said dividing wall. On the one hand, the sensor must measure the changes in air pressure in the wet space. On the other hand, the electrical components or at least the plugs and cables must be accommodated in the electrically safe dry space.

To this end, the dividing wall has an opening. The air pressure is transmitted through said opening to what is called a dry-space sensor. Said sensor is arranged in the dry space. The plug of a wet-space sensor is located in the wet space and fastened to an opening of the dividing wall. At the same time, the opening in the dividing wall is closed by adapting the fastening element.

A generic fastening device is known from DE 10 2008 048 318 and counterpart US 2012/0000291, for example. DE 10 2008 048 318 presents a quarter-turn fastener solution instead of a screwed connection. In said quarter-turn fastener, a retaining element having at least one, preferably at least two, retaining wing(s) is rotatably arranged in a supporting element, wherein the retaining wings can be inserted into the opening of the wall in a first rotational position and reach behind the wall in the second rotational position, thereby fastening the supporting element, the retaining element and the assembly located thereon to the wall. In this way, mounting can be performed without tools and fast and yet safely. One or more supporting nose(s) arranged on the supporting element can prevent the supporting element from joining in the rotation, and an additional locking unit can prevent the retaining element from rotating back after a predetermined (e.g., the intended) end position is reached, wherein the retaining element is manually rotated relative to the supporting element by grasping the retaining element.

SUMMARY OF THE INVENTION

An object of one or more embodiments of the present invention is to provide a further development of such a fastening device, said further development making easy and safe mounting of the device without tools possible.

The above object can be achieved according to an embodiment of the invention in a fastening device for fastening an assembly in an opening of a vehicle wall of a vehicle. In this embodiment, the fastening device comprises a supporting element to be placed on the vehicle wall, and a retaining element having at least one retaining wing and at least one graspable rotating wing. The retaining element is rotatable relative to the supporting element. The at least one retaining wing is configured and arranged to fasten the fastening device in the opening of the vehicle wall. The rotating wing has a grasping surface that is configured and arranged to be grasped (by a person installing the fastening device) and rotated in a direction of rotation for fastening the fastening device. The grasping surface is inclined in the direction of rotation relative to a plane of the vehicle wall. Due to this inclination of the grasping surface, the grasping and rotating force applied by the person installing the fastening device acts both in a tangential rotational direction and in an axial direction toward the vehicle wall. This facilitates the installation, because the installing person can easily simultaneously press the fastening device against the vehicle wall and rotate the retaining element into a fastened or engaged position. According to a further preferred embodiment feature, the grasping surface is inclined at an acute inclination angle relative to the plane of the vehicle wall, whereby the vehicle wall is perpendicular to an axis of the fastening device.

If one wants to have a large number of such assemblies manually mounted in vehicles (possibly in places that are not easily accessible) in industrial production on the assembly line, it is desirable to have ergonomically shaped assemblies and it is necessary to make sure that a required force is generated that acts in the direction of rotation and acts in an axial direction to press the assembly against the vehicle wall regardless of the respective physical strength of the respective fitter or installer, and regardless of the number of repetitions.

BRIEF DESCRIPTION OF THE DRAWINGS

In the following, the invention will be explained in greater detail on the basis of exemplary embodiments and with the aid of the figures. The figures always show views of exactly one exemplary embodiment in the different positions and with different sections for illustrating the mode of operation in the interior. However, the teaching according to the claims is defined by the patent claims and should not be construed as being limited to only that one exemplary embodiment. In the drawings:

FIG. 4a is a partially sectioned side view of the fastening device on a different plane compared to FIG. 3a;

DETAILED DESCRIPTION OF EXAMPLE EMBODIMENTS OF THE INVENTION

Figure 1:
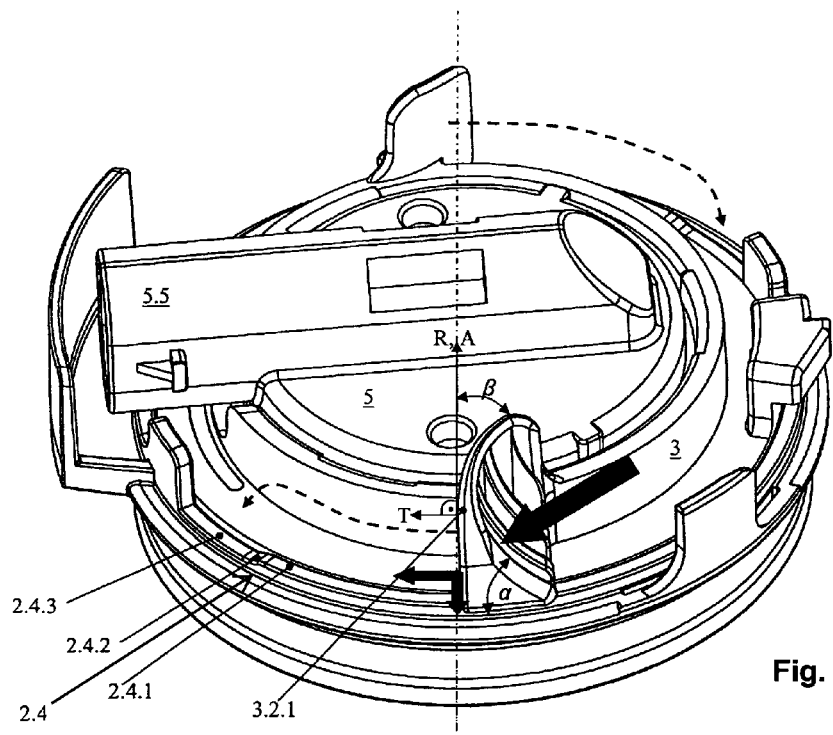
FIG. 1 is a schematic perspective view of a fastening device according to an embodiment of the invention in an initial position.
Figure 2:
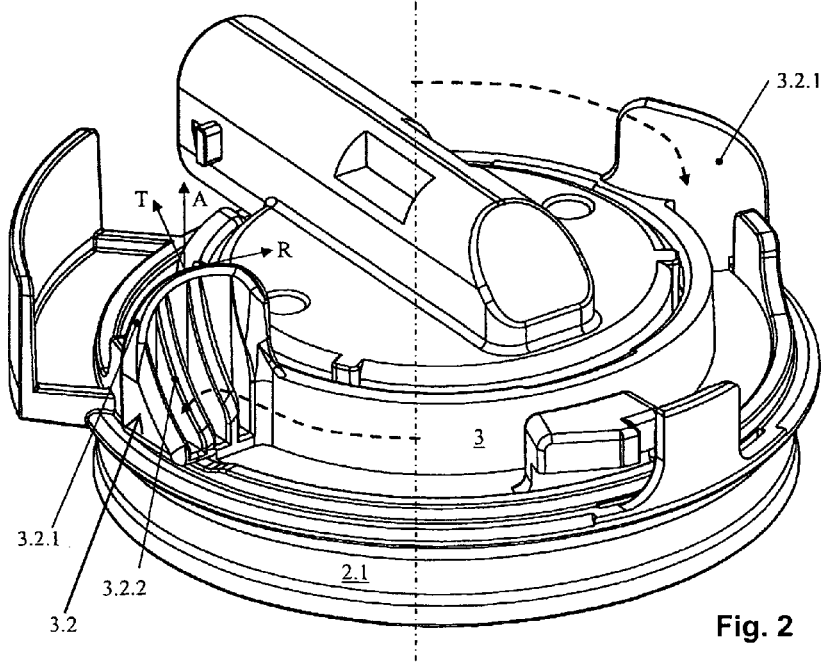
FIG. 2 is a schematic perspective view of the fastening device according to FIG. 1 after a retaining element thereof has been rotated to an end position.
Figure 3A:
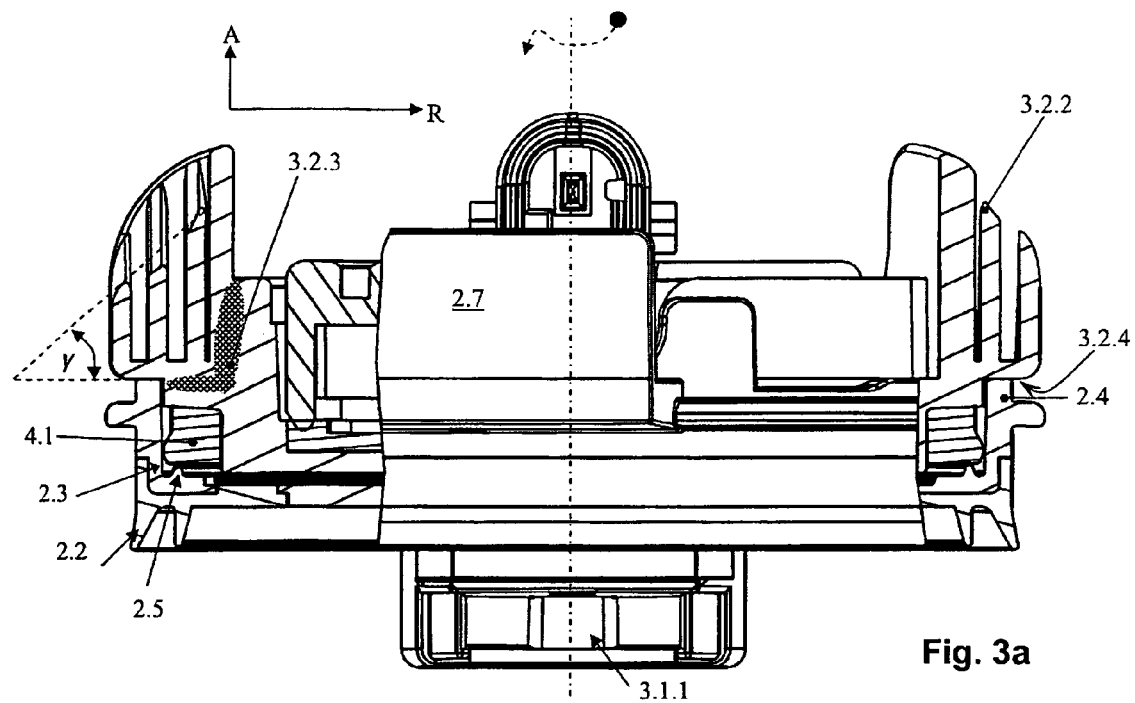
FIG. 3a is a partially sectioned side view of the fastening device.
Figure 3B:
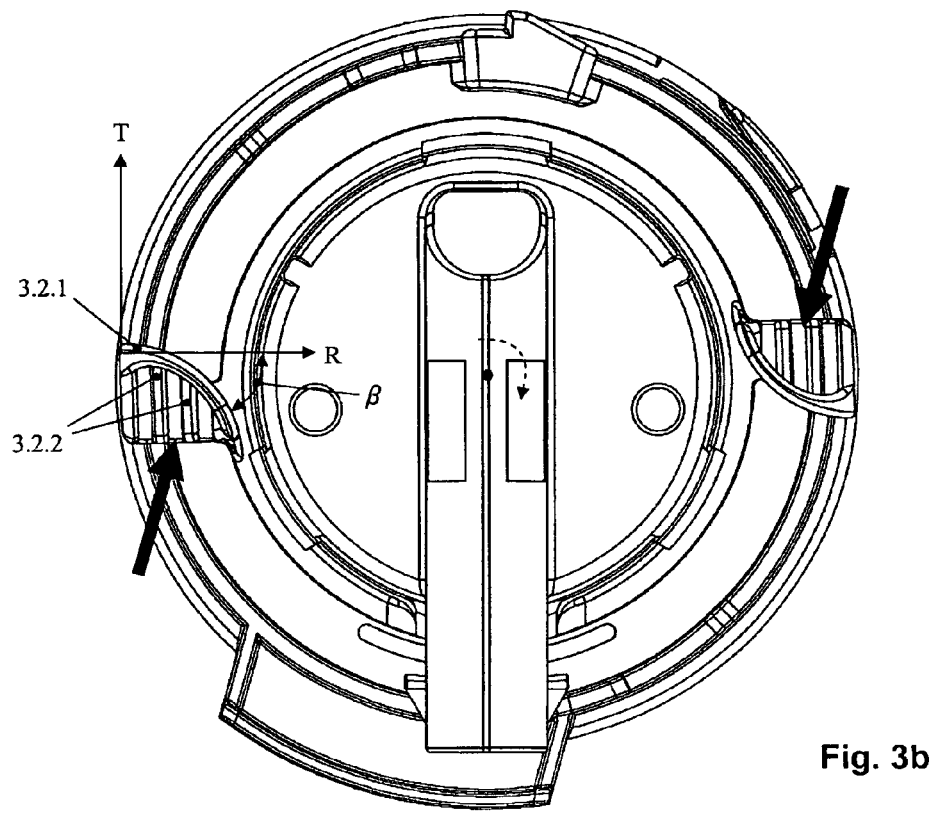
FIG. 3b is a top plan view of the fastening device.

In the following, similar reference numerals may denote elements having similar functions and/or similar elements. Moreover, the reference numerals are generally ordered in a hierarchical way, and the first digit or component of a reference numeral always indicates the respective overall element.

FIGS. 1 through 5 are largely self-explanatory when taken in conjunction with the attached list of reference numerals. In addition, express reference is made to the parts and functions of somewhat similar components that were already partially described in the generic application DE 10 2008 048 318 A1 and US Published Application US 2012/0000291 A1.

Figure 4A:
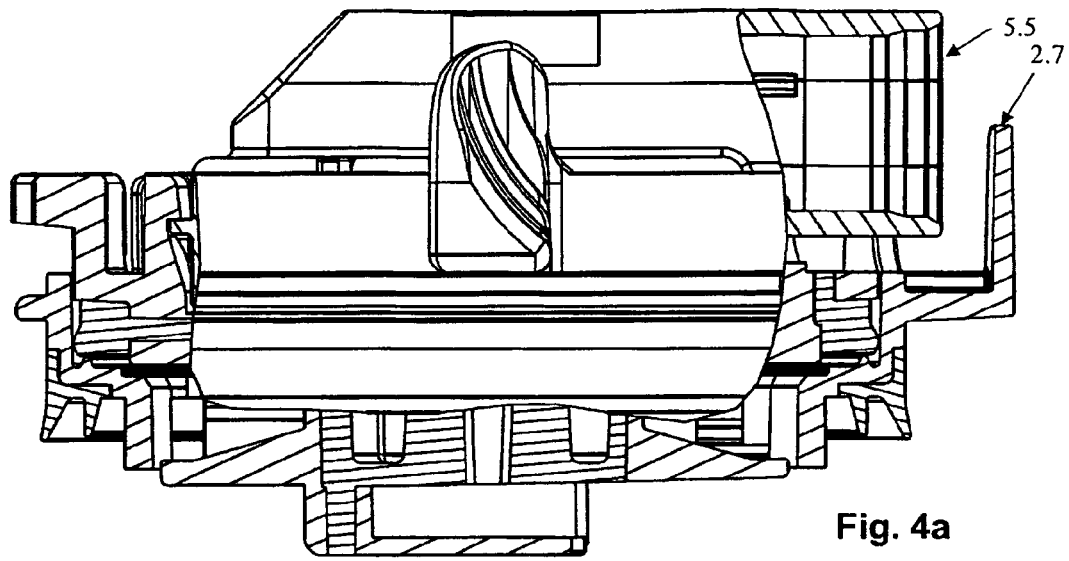
Figure 4B:
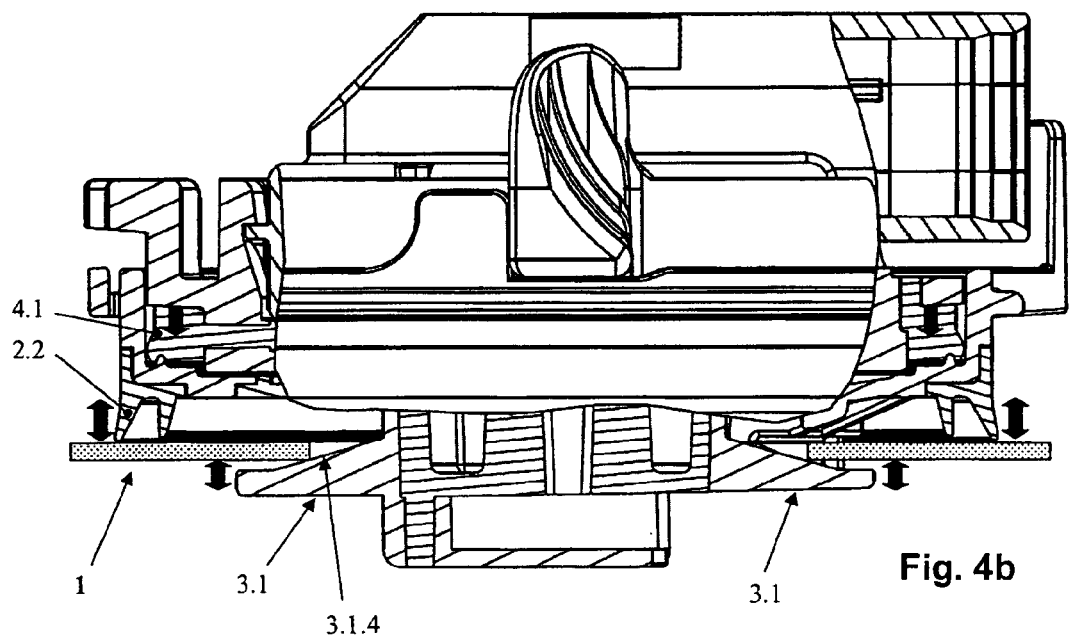
FIG. 4b is a view of the fastening device similar to that of FIG. 4a but showing the fastening device mounted and fastened through a hole on a vehicle wall.
Figure 5A:
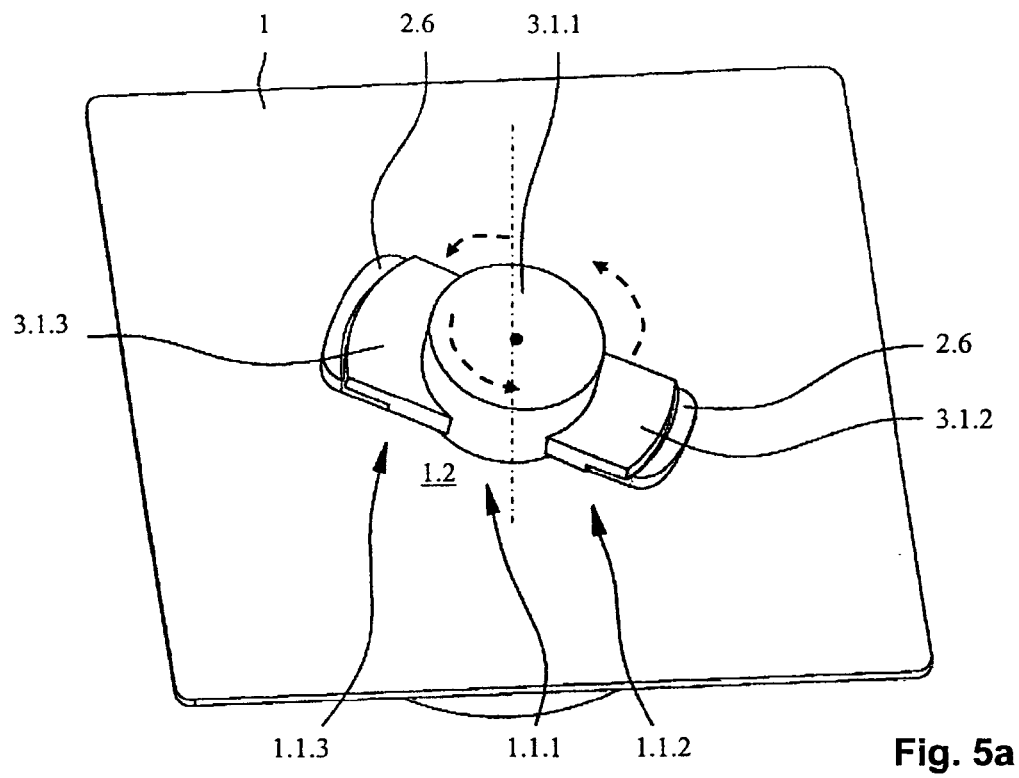
FIG. 5a is a schematic perspective view of a rear or back side of the fastening device being inserted through the hole of the vehicle wall.
Figure 5B:
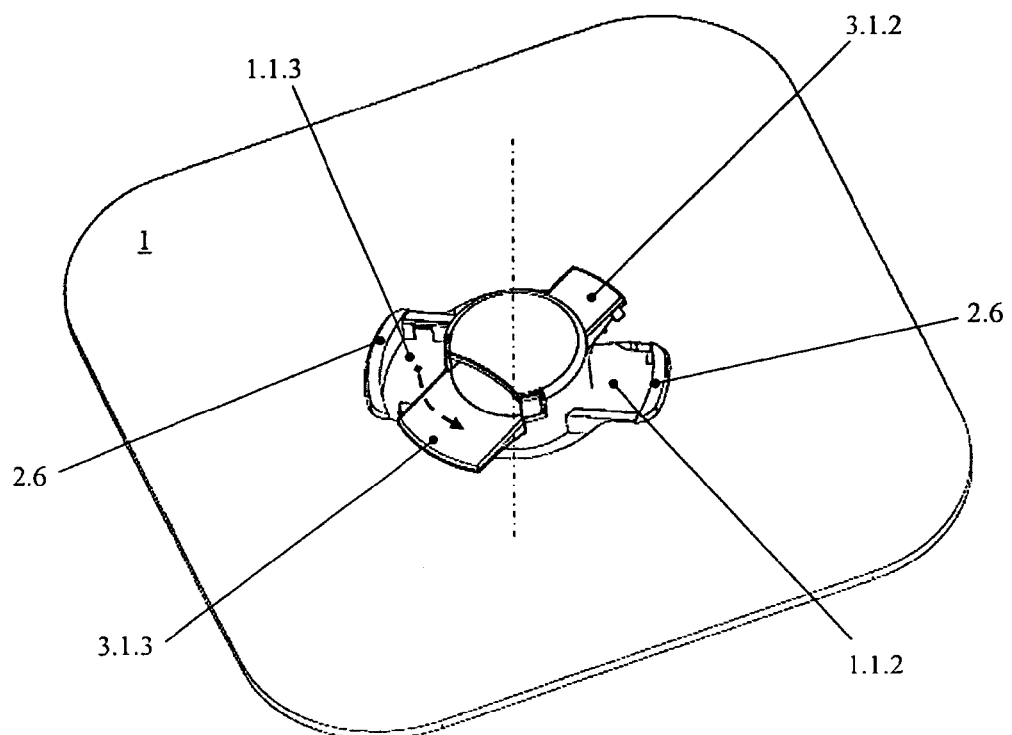
FIG. 5b is a schematic perspective view similar to FIG. 5a, but showing retaining wings of the fastening device rotated to a fastened or engaged position.
Figure 6:
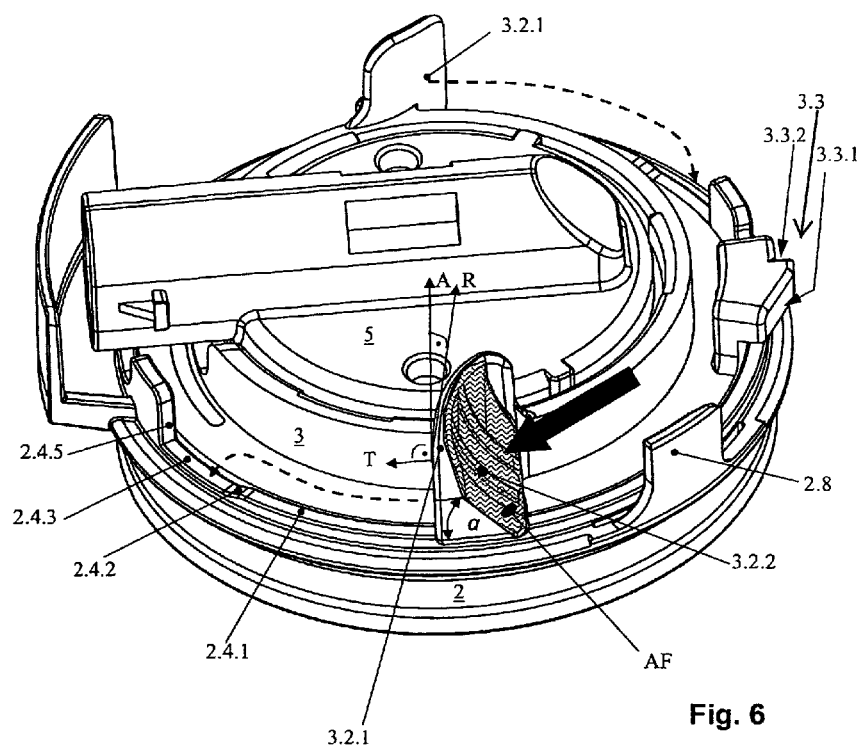
FIG. 6 is a schematic perspective view similar to FIG. 1 but highlighting a grasping surface of a graspable rotating wing of the fastening device.

FIG. 1 shows the fastening device in its starting position and, at the same time, sketches the path of rotation along which the retaining element 3 is moved to its end position (see FIG. 2) by a force acting on the graspable rotating wings 3.2, wherein according to a preferred advantage of an embodiment of the present invention, it is no longer necessary to cumbersomely grasp all over the retaining element 3 and rotate it, but instead the graspable rotating wings 3.2 are used to apply a force radially on the periphery in a well-directed manner and thus with the best possible torque about the axis of rotation, said force at the same time acting at least both in the tangential direction T and in the axial direction A toward the vehicle wall 1 (see FIGS. 1 and 4b). At the same time, grasping is preferably easy as far as ergonomics is concerned. To this end, the grasping surface AF in this preferred exemplary embodiment has a fingertip-shaped concave curvature and is inclined, particularly at least in the direction of rotation during the fastening process (opposite the direction of rotation for opening or releasing the fastening device), toward the direction of rotation and toward the wall (i.e., in the tangential direction T) at an angle alpha. Said inclination at an angle alpha causes the impressed force to be distributed both in the tangential direction T for generating the rotational movement and in the axial direction A toward the vehicle wall for pressing the fastening device onto the vehicle wall during the rotation.

Moreover, the grasping surface AF is also inclined in the radial direction R at an angle beta and in the axial direction A at an angle gamma so that a part of the force acts in the radial direction R, thereby preventing the installer's fingertips from slipping during rotation.

Each graspable rotating wing 3.2 comprises a wing, wall 3.2.1 that is approximately perpendicular to the direction of rotation T and that is parallel to the axial direction A. Said wing wall 3.2.1 is reinforced by at least two webs 3.2.2 that extend approximately perpendicular to the wing wall (and thus parallel to the tangential direction T) and that are parallel to the axial direction A, i.e., the wing wall 3.2.1 and the webs 3.2.2 are at least essentially parallel to the axial direction A. Therefore, if the retaining element 3 is manufactured in an injection mold, the retaining element 3 can be pushed out of the mold by a simple axial movement.

The webs 3.2.2 extend from the transition region 3.2.3 between the retaining element and the rotating wing across at least a part of the surface of the wing wall 3.2.1 of the rotating wing and are beveled or angled at free edges thereof along the grasping surface AF such that on the whole a grasping surface AF is obtained that is inclined at least in the direction of rotation toward the direction of rotation and toward the vehicle wall, i.e., inclined toward the rotation direction to form an acute angle relative to a plane of the vehicle wall which is a plane perpendicular to the axis of the fastening device. Thus, an actually inclined grasping surface AF for the fingertips placed on the webs 3.2.2 is obtained because the axial height of the webs 3.2.2 is smaller than that of the wing wall 3.2.1 and because the free edges of the webs 3.2.2 are beveled or angled.

The distance between the webs in the radial direction is not greater than 5 mm so that the webs are perceived as a virtually well-closed or substantially solid continuous surface by the fingertip, i.e., the webs do not significantly cut into the fingertip but instead the grasping surface AF is perceived as a rather well-closed or solid continuous surface because the required rotatory forces and pressing forces are not so high.

The fastening device preferably has two rotating wings 3.2 that are offset relative to each other by at least approximately 180 degrees so that the evenness of the pressing-on and rotation operations without jamming is ensured and the natural position of the hand is made use of during fastening by rotating.

Consequently, both the wall 3.2.1 and the webs 3.2.2 thereof extend parallel to in the axial direction A and parallel to the axis of rotation, whereby it is possible to directly remove the entire retaining element 3 together with the rotating wings 3.2 from an injection mold without having to use any special tools on account of any inclined angles. On the other hand, the desired inclination of the grasping surface AF is achieved since the webs are beveled or angled at their outer free edges.

The general operation of rotating the retaining element 3 for fastening the device in an opening 1.1 in the vehicle wall 1 can be understood from the FIGS. 2 to 6, and the explanation of the generic fastening device in the patent applications DE 10 2008 048 318 A1 and US 2012/0000291.

LIST OF REFERENCE NUMERALS 1 wall
1.1 opening
1.1.1 interior circular opening region
1.1.2 opening region for the narrower retaining wing
1.1.3 opening region for the wider retaining wing
1.2 edge zone of the wall around the opening in which the retaining wings reach behind
2 supporting element
2.1 base body of the supporting element
2.2 sealing element on the supporting element toward the wall
2.3 recess for the sealing element and clearance
2.4 edge portion on the supporting element
2.4.1. first path portion on the edge portion
2.4.2. second path portion on the edge portion
2.4.3. indentation on the edge portion
2.4.4. first stop on the edge portion
2.4.5. end stop on the edge portion
2.5 form on the supporting element toward the interior sealing element between the supporting element and the retaining element
2.6 supporting noses on the supporting element
2.7 cover for plug-in region
2.8 reverse-lock tab
3 retaining element
3.1 retaining wing 3.1.1. central connecting region with splash guard for channel in the sensor assembly
3.1.2. narrower retaining wing
3.1.3. wider retaining wing
3.1.4. inner surface of the retaining wings toward the wall
3.2 rotating wing
3.2.1. wall of the rotating wing
3.2.2. reinforcing webs on the rotating wing
3.2.3. transition region between the rotating wing and the rest of the retaining element
3.2.4. rotating-wing region of contact with the edge portion
3.3 reverse-lock hook
3.3.1 ramp segment on the reverse-lock hook
3.3.2 stop segment on the reverse-lock hook
4.1 sealing element in the cavity
5 sensor assembly
5.5 electrical contact plug
AF grasping surface in the direction of rotation for fastening
A axial direction, i.e., direction of the axis
R radial direction, i.e., direction toward the axis or outward corresponding to the radius
T tangential direction
$\alpha$ angle of inclination of the grasping surface in the tangential direction
$\beta$ inclination of the grasping surface in the radial direction
$\gamma$ inclination of the grasping surface in the axial direction

The invention claimed is:

1. A fastening device for fastening an assembly in an opening of a vehicle wall of a vehicle, wherein the fastening device has:
a supporting element configured and arranged to be placed on the vehicle wall; and
a retaining element having at least one retaining wing configured and arranged for fastening the fastening device in the opening of the vehicle wall, wherein the retaining element is rotatably arranged to rotate about a rotation axis relative to the supporting element to be rotatable in a rotation direction for fastening the fastening device;
characterized in that
at least one rotating wing is arranged on the retaining element and has a grasping surface that is inclined toward the rotation direction,
the rotating wing comprises a wing wall that extends essentially parallel to the rotation axis and at least two webs that reinforce the wing wall and that extend essentially perpendicular to the wing wall and essentially parallel to the rotation axis,
the webs extend from a transition region between the retaining element and the rotating wing across at least a part of a surface of the wing wall, and
the webs are beveled along free edges thereof such that the free edges form the grasping surface that is inclined toward the rotation direction.

2. The fastening device according to claim 1, characterized in that edge regions of the wing wall and/or of the webs of the rotating wings are rounded.

3. The fastening device according to claim 1, characterized in that a distance between the webs is not greater than 5 mm so that the webs are perceived as a virtually well-closed surface by a human fingertip.

4. An apparatus comprising a fastening device for fastening an assembly in an opening of a vehicle wall of a vehicle, wherein the fastening device comprises:
a supporting element configured and arranged to be placed on the vehicle wall; and
a retaining element that is rotatably arranged to rotate about a rotation axis relative to the supporting element, and that has at least one retaining wing configured and arranged for fastening the fastening device in the opening of the vehicle wall, and that has at least one manually graspable rotating wing with a grasping surface that is manually graspable by a person for rotating the retaining element in a first rotation direction about the rotation axis for fastening the fastening device, wherein the grasping surface is inclined in the first rotation direction at a slope angle relative to a plane perpendicular to the rotation axis.

5. The apparatus according to claim 4, wherein the slope angle is an acute angle.

6. The apparatus according to claim 4, wherein a vertex of the slope angle is directed opposite the first rotation direction.

7. The apparatus according to claim 4, wherein the grasping surface is configured and arranged so that a manual grasping force applied by the person perpendicularly onto the grasping surface includes a first force component along the first rotation direction and a second force component along an axial direction parallel to the rotation axis.

8. The apparatus according to claim 4, wherein the rotating wing comprises a wing wall that extends essentially parallel to the rotation axis and plural webs that extend from the wing wall essentially perpendicular to the wing wall and essentially parallel to the rotation axis, and wherein the webs have sloping free edges that form the grasping surface.

9. The apparatus according to claim 8, wherein the webs are spaced apart from one another respectively by no more than 5 mm.

10. The apparatus according to claim 4, wherein the rotating wing has a single-piece structure made of a same material as the retaining element.

11. The apparatus according to claim 10, wherein the material is a plastic and the rotating wing is an injection-molded component made of the plastic.

12. The apparatus according to claim 4, wherein the grasping surface is a curved surface that has a concave curvature.

13. The apparatus according to claim 12, wherein the concave curvature is configured complementary to a convex curvature of a human fingertip.

14. The apparatus according to claim 4, wherein the rotating wing extends from a periphery of the retaining element in an axial direction parallel to the rotation axis oppositely away from the support element.

15. The apparatus according to claim 4, wherein the grasping surface is additionally inclined from an axial direction parallel to the rotation axis, at an acute angle relative to the plane perpendicular to the rotation axis, wherein a vertex of the acute angle is directed radially outwardly away from the rotation axis.

16. The apparatus according to claim 4, wherein the grasping surface is additionally inclined from a radial direction extending radially from the rotation axis, at an acute angle relative to the radial direction, wherein a vertex of the acute angle is directed radially outwardly away from the rotation axis.

17. The apparatus according to claim 4, wherein the at least one manually graspable rotating wing comprises two said manually graspable rotating wings that are arranged essentially diametrically opposite one another about the rotation axis on the retaining element.

18. The apparatus according to claim 4 further comprising the assembly connected to said fastening device, wherein said assembly is a sensor assembly.

19. A device configured to be manually releasably fastened on a planar wall segment, said device comprising:
- a support element configured to be placed and bear against a first side of the planar wall segment along a support plane defined by said support element, around a wall opening in the planar wall segment, and
- a retaining element that is rotatably attached to said support element so as to be relatively rotatable about a rotation axis perpendicular to said support plane,
- wherein said retaining element includes at least one retaining wing configured to pass through the wall opening in a first rotational position, and in a second rotational position to engage and bear against a second side of the planar wall segment opposite the first side thereof so as to thereby fasten said device on the planar wall segment engaged between said support element and said at least one retaining wing, and
- wherein said retaining element further includes at least one manually graspable rotating wing that is connected to said at least one retaining wing for rotation together therewith and is positioned on an axially opposite side of said support element relative to said at least one retaining wing, wherein said rotating wing has a grasping surface that is manually graspable by a person for rotating said retaining element about said rotation axis in a first rotation direction from said first rotational position to said second rotational position, and wherein said grasping surface is inclined in said first rotation direction relative to said support plane.

20. The device according to claim 19, wherein said grasping surface is concavely curved, and is additionally inclined relative to a radial direction that extends radially from said rotation axis.

* * * * *